Dec. 1, 1959 K. R. SCHNEIDER 2,915,160
INTERMITTENT DRIVING MECHANISM
Filed July 11, 1956 4 Sheets-Sheet 4
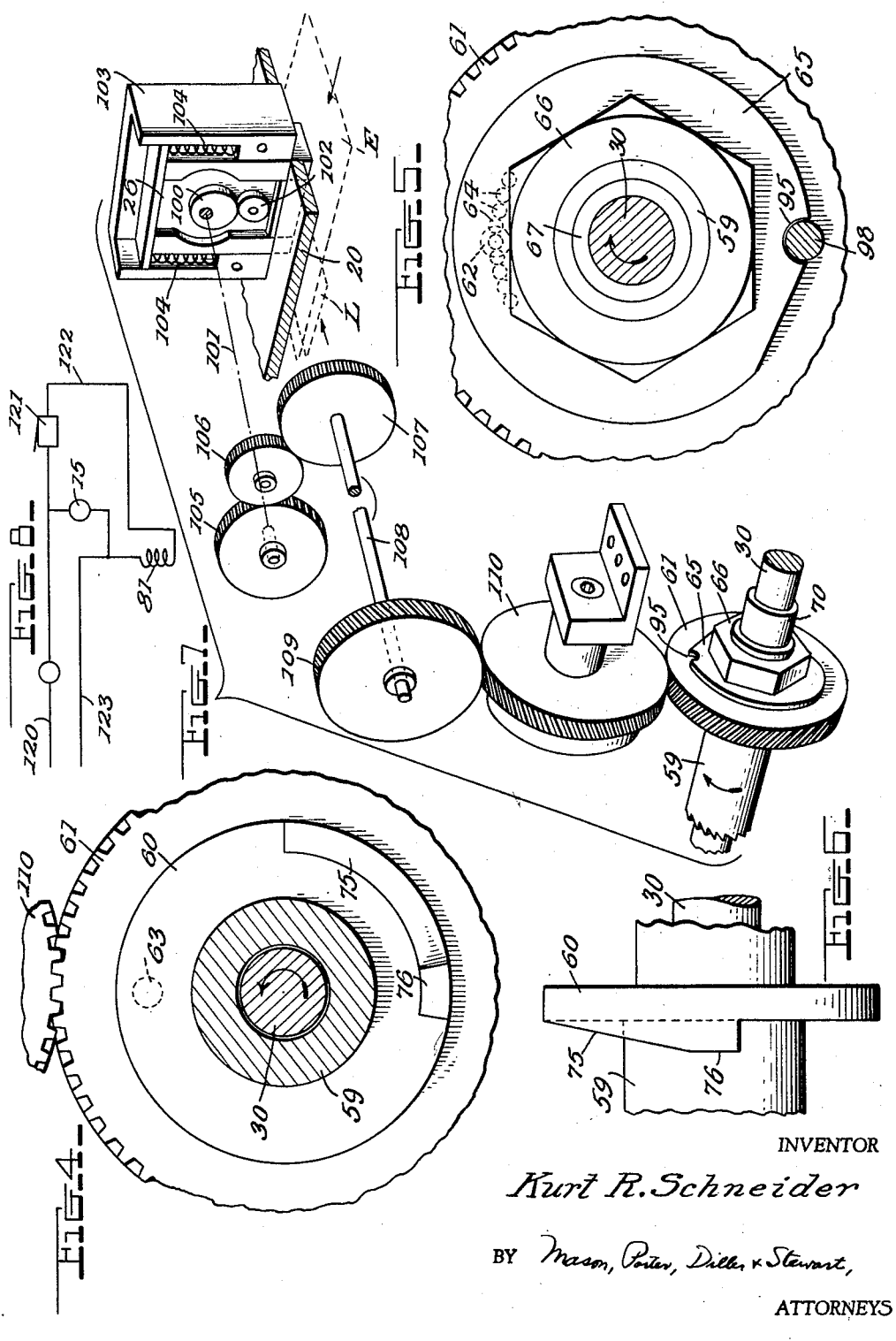
INVENTOR
*Kurt R. Schneider*
BY *Mason, Porter, Diller & Stewart,*
ATTORNEYS

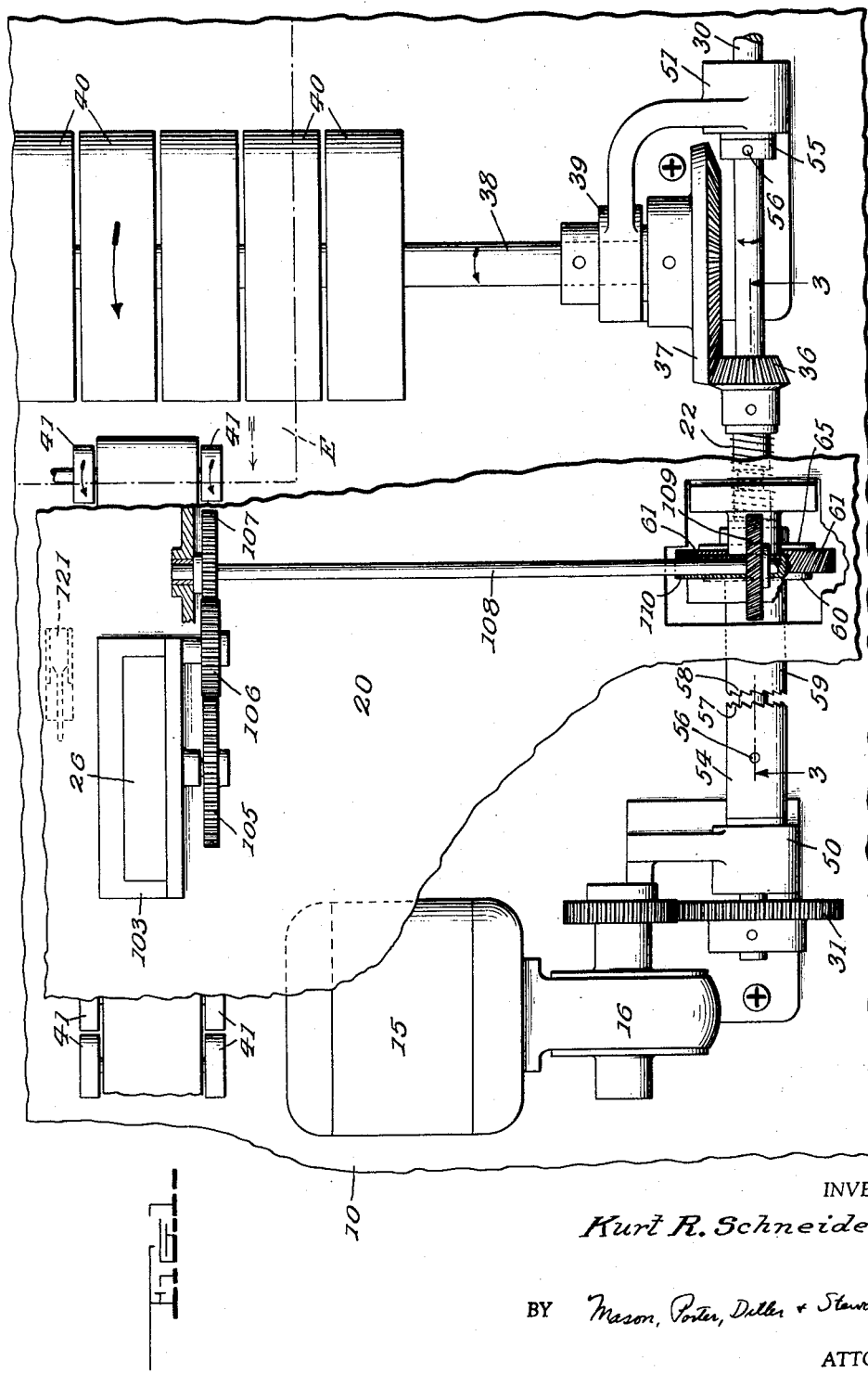

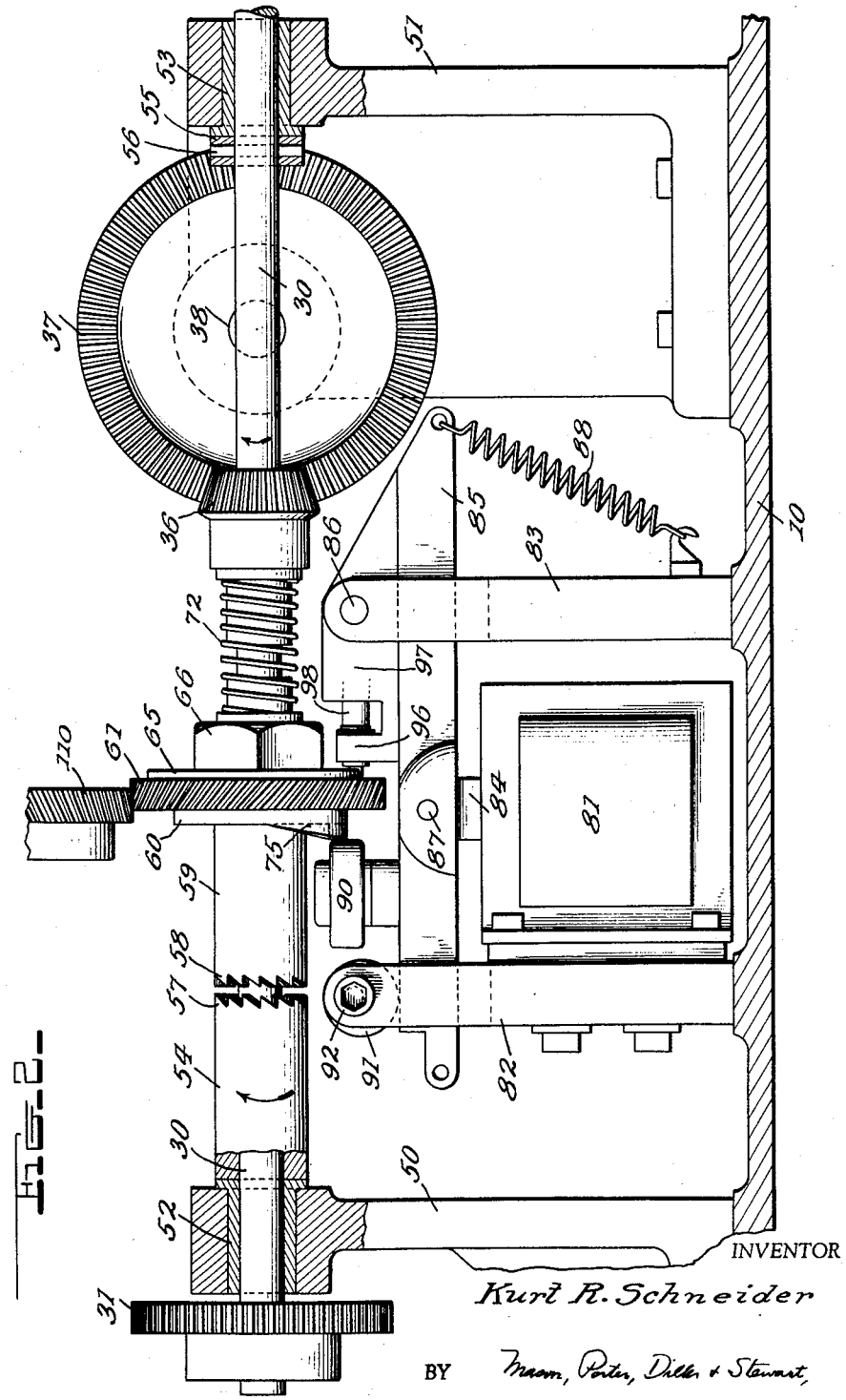

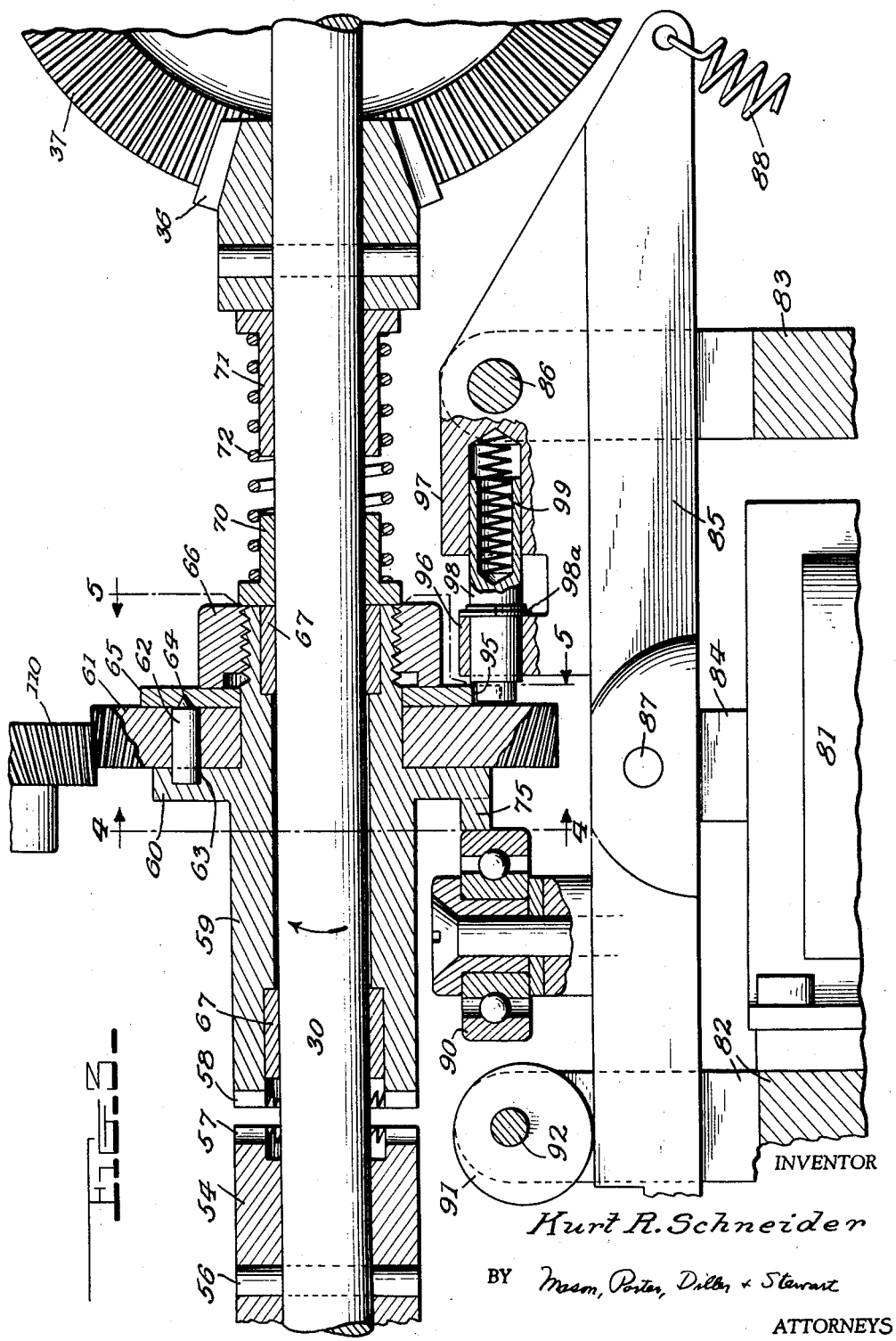

2,915,160

INTERMITTENT DRIVING MECHANISM

Kurt Rudolf Schneider, Bainbridge, N.Y., assignor to Eureka Specialty Printing Company, Scranton, Pa., a corporation of Pennsylvania Application July 11, 1956, Serial No. 597,150

15 Claims. (Cl. 192—139)

This invention relates to an intermittent driving mechanism including a clutch device.

An object of the invention is the provision of an intermittent driving mechanism including a clutch element which is moved out of engagement at the end of a cycle of operation by a cam forming part of its structure, together with means for stopping and holding a part in accurate position at the end of the cycle.

Another object is the provision of an intermittent driving mechanism including a movable clutch element and a movable member having parts cooperative therewith for moving the clutch member out of engaging position and detaining it at the end of a cycle of movement, said movable member upon momentary actuation serving to release the clutch device for closing, and thereafter returning to position for contacting and causing the clutch member to open.

A further feature of the invention is the provision of an intermittent driving mechanism including a movable clutch member having a part for driving the device to be actuated, said part being so interengaged that the closing movement of the clutch causes the part to begin its movement prior to driving through the clutch elements.

Another object of the invention is the provision of an intermittent driving mechanism in which the load to be intermittently driven is connected to a clutch member through skew gears so that the reaction in the skew gears is effective for producing an initial rotation of a clutch member prior to clutch engagement and for maintaining the clutch engagement during acceleration of the load.

With these and other objects in view as will appear in the course of the following description and claims an illustrative form of practice of the invention is shown on the accompanying drawings, in which:

Figure 1 is a side elevation of a clutch device according to this invention, connected with a source of power and a load to be intermittently driven.

Figure 2 is a side elevation of the same, on a larger scale, with certain control and driven parts shown in conventional form.

Figure 3 is an upright sectional view substantially on line 3—3 of Figure 1.

Figure 4 is a conventionalized upright sectional view, substantially on line 4—4 of Figure 3 showing a clutch releasing cam structure.

Figure 5 is an upright sectional view substantially on line 5—5 of Figure 3, showing a clutch latching structure and associated parts.

Figure 6 is an edge elevational view of the clutch releasing cam structure of Figure 4.

Figure 7 is a perspective view of a load device and train to be connected intermittently by the clutch, during the course of a cycle.

Figure 8 is a circuit diagram.

In the structure shown in Figs. 1 and 2, a base 10 has parts mounted thereon, including an electric motor 15 operating through a reduction gearing 16 for driving the gear 31 fixed on the constantly driven shaft 30. A bevel gear 36 fixed on the shaft 30 is in mesh with a bevel gear 37 fixed on the constantly driven work shaft 38 supported in bearings 39 and connected for constantly driving a load such as the feed rollers 40, 41, in the illustrative application of the intermittent drive mechanism to a machine for receiving articles and applying labels thereto. This arrangement is conventionalized in Figs. 1 and 7 as including a table 20 having an aperture therein beneath which an envelope E may be passed by the feed rollers 40, 41, to a position beneath an opening in the table 20, whose edges provide a die. A label sheet or strip L is fed over the aperture by intermittent means not shown. The punch 26 is a load to be intermittently driven, and during its downward movement serves to sever a label by cooperation with the edges of the aperture, and deliver this severed label onto the envelope E. A preferred driving connection is hereinafter described in connection with Fig. 7.

The standards 50, 51 support the bearing sleeves 52, 53 for the constantly driven shaft 30, these sleeves having enlarged ends for engaging the bushings 54, 55 which are held on the shaft 30 by pins 56 whereby to restrict axial movement of the shaft. The bushing 54 is provided at its other end with clutch teeth 57 having axial and inclined faces to mate with correspondingly shaped faces of the clutch teeth 58 on the member 59 which is mounted to slide on the shaft 30 with permissive rotation of the shaft within it.

A clutch head assembly is slidable on the shaft 30 and includes the member 59 which has a radially projecting flange 60 intermediate its ends. A helical or skew gear 61 is mounted upon the member 59 for rotation relative thereto, and bears (Fig. 3) against the flange 60, being normally held against such rotation by the pin 62 which can slide in an axial direction in the gear body and occupies by one of its ends a hole 63 in the flange 60 and spaced (Fig. 4) relative to a cam portion 75, 76 thereon, as described hereinafter. The other end of the pin is reduced conically for engaging in a selected one of the sockets 64 (Fig. 5) of a disk 65 which is mounted on and rotatable relative to the member 59. The end of the member 59 is threaded, for receiving the clamping nut 66 which, when tightened, presses the disk 65 against the gear 61 and the latter in turn against the flange 60, with the pin 62 then interlocking the parts against relative rotation and assuring a positive drive from the flange 60 to the gear 61. The member 59 is illustratively provided with internal bearing sleeves 67 for its mounting on the shaft 30: so that the clutch head unit assembly of parts 59, 60, 61, 62, 65, 66, and 67 is free for sliding and relative rotation on the shaft 30.

Bushings 70, 71 are fitted on the shaft 30, between the bevel gear 36 and the end of the member 59, and have end flanges for engaging the same and for receiving the ends of a coil spring 72 which acts against the member 59 to move the clutch head assembly toward clutch-closing position.

The flange 60 has (Figs. 2, 3, 4 and 6) an axially projecting ramp or cam portion 75 for a part of its periphery (Figs. 2, 3 and 5) with an end portion 76 in a radial plane: which are at fixed angular distances from the hole 63.

A solenoid structure is fixed on the base 10 and includes the coil 81, the standards 82, 83, and a solenoid core 84: The coil 81 is illustratively of encased type, mounted on the standard 82. A lever 85 is mounted by the pivot 86 on the standard 83, and is guided in a slot in standard 82. The core 84 is connected to lever 85 by a pivot 87. A spring 88 is connected to the standard 83 and to the lever 85, and acts upon the lever to lift the core 84. A roller 90 is mounted on the lever, for rotation about an axis substantially in a radial plane of the shaft 30, and acts as a follower for the cam 75. This roller is positioned, when the lever 85 is in raised position, in the path of movement of the cam portion 75 (Figs. 2 and 3); and is below the level of the same when the lever 85 has been drawn downward upon energization of the coil 81. The roller 90 is illustratively shown as a ball bearing structure having its outer race mounted to be movable between the stated positions, and its inner race secured to the lever 85. The upward movement of the lever 85 is defined by an adjustable eccentric stop 91, carried by the standard 82 in the lever guiding slot and held in adjusted position by tightening its pivot bolt 92.

The disk 65 (Figs. 3 and 5) has a notch 95 in its periphery. The lever pivot 86 is preferably at the level of the notch 95; and the lever 85 has spaced portions 96, 97 with alined holes for mounting the sliding bolt 98 which is urged against the disk 65 and to engagement in the notch 95 by a spring 99 for determining the end of cycle or latch-up position for the clutch head assembly. A split ring 98a is received in a groove of the bolt 98 to limit its spring-urged movement.

The motor 15 when energized rotates the shaft 30 in a clockwise direction (Fig. 5) and as shown by the arrows in Figs. 1, 2 and 3, and drives the bevel gear 36 and therewith the conventionalized feed rollers 40, 41. The helical gear 61 and the driven helical gear 110 of the intermittently driven structure have their teeth so arranged that when the clutch head assembly is released for clutch-closing movement, the helical gear 61 sides axially relative to the helical gear 110 and therewith, when the gear 110 is at a standstill, is given a clockwise rotational movement, i.e., in the direction of rotation of the shaft 30, so that the clutch head assembly and the shaft 30 are turning in the same direction at the moment of clutch engagement, thereby reducing initial shock and noise. In the illustrative form, the helical gear 61 is right-hand and the helical gear 110 is left-hand.

It will further be noted that when the clutch head assembly is released from the stop bolt 98, the cam 28 and its connecting shafts can begin to turn without major load, because the cam shape changes shape, i.e. the radial distance from the axis of shaft 29, slowly: which contributes to having a low load taken by the clutch teeth 57, 58 at their engagement. When the engagement occurs, and power transfer begins, the interaction of the helical gears tends to move the clutch assembly against the spring 72 so that the load assumption is spring cushioned. During the early part of the power driving, the load is relatively low during pick-up of the punch 26 and while the punch 26 moves downward and compresses the springs 104, but increases as the punch acts to sever and apply the label. After the punch has attained its lowermost position, the springs 104 now act to raise it again. Thus the load upon the clutch teeth increases to a maximum in the illustrative form, and then decreases again so that the load demand by the spring and punch assembly has become zero when the cam again approaches its initial position. During this latter stage, the cam portion 75 on the flange 60 encounters and begins to react against the roller 90, thereby moving the clutch head assembly toward the clutch-disengaged position and against the action of spring 72. This movement of the clutch head assembly is accomplished with a relative sliding of the helical gears 61, 110 which are then relatively unloaded as described above. The momentum of the intermittently driven parts now serves, as the flat portion 76 of the cam piece comes opposite the roller 90, to continue the movement of the clutch head assembly, with an unloading of the clutch teeth, and a loading effect against the spring 72 by the reaction between the helical gears so that a braking effect is exerted to bring the clutch head assembly and associated parts to a standstill with a gentle arresting as the stop bolt 98 enters the notch 95, noting that the load upon the clutch teeth 57, 58 by reason of the action of the cam portion 75 has ceased, and that the roller 90 rests against the portion 76 at the end of the cycle when the assembly is being latched.

In the circuit diagram, Fig. 8, the power conductor 120 leads through a main switch to the motor 15 and to the normally open initiating switch 121. The motor 15 operates when the main switch is closed. When the switch 121 is encountered by an article to be processed, it closes and current flows by conductor 122 to the solenoid coil 81 and thence to the common return conductor 123.

In operation, with the motor 15 operating and driving the shaft 30 in the direction shown by the arrows, the feed roll 40 is driven. The punch 26 is assumed to be in raised position (Fig. 4); with the roller 90 engaging the surface cam 76 of the cam 75 and holding the member 59 with the clutch teeth 57, 58 disengaged and the spring 72 compressed; and with the bolt 98 engaged in the notch 95 of disk 65 so that the member 59 and associated parts are latched against rotation. The solenoid coil 81 is deenergized.

The punch 26 may be made and operated as taught in my copending patent application, Ser. No. 285,386 filed May 1, 1952, now Patent No. 2,754,022, granted July 10, 1956; but it is presently preferred to employ a spring-lifted punch. For this purpose, the cam 100 on the shaft 101 engages a roller 102 mounted on the punch 26 and forces the punch downward in its guide housing 103 during an early part of a revolution of the shaft 101 from its standstill at the beginning of a cycle, to the position (Fig. 7) with the punch 26 fully depressed, corresponding to the position of the notch 95 above the shaft 30; and, during a later part of the revolution, the cam surface retreats relative to the table and label planes, so that the punch 26 is raised by the springs 104 with the roller 102 acting as a follower to limit the rate of upward motion of the punch 26. The shaft 101 has a gear 105 thereon, to which motion is transmitted by an idler gear 106 from the gear 107 on shaft 108. The shaft 108 has thereon a helical gear 109, which is in mesh with the helical gear 110; a radial plane through shaft 108 and helical gear 109 being at right angles to the axis of helical gear 110, the helical tooth angles being about 45 degrees so that motion can be transmitted in both directions. The pairs of gears 61, 110, and 107, 105 are of like tooth numbers in the individual pairs, so that one revolution of the clutch head assembly is accompanied by one revolution of the cam 100, whereas the idler gears 110, 106 may be any desired size to accommodate the desired spacing of shafts. With this arrangement, while the springs 104 are acting to lift the punch 26 during the later part of a cycle, the roller 102 acts upon an inwardly spiralling surface of the cam 100 and produces a turning effort thereon, thereby tending to accelerate it and thus to unload the shaft 101.

When the feed system engages and advances an article, the article is fed until it closes the switch 121, and therewith the energizing circuit for the solenoid coil 81 is closed. The energized coil 81 causes the core 84 to move downward, rocking the lever 85 about its pivot 86 against the action of the spring 88.

Therewith two mechanical events occur for releasing the member 59: firstly, the downward rocking of the lever extensions 96, 97 moves the bolt 98 radially relative to the disk 65 so that the bolt passes from the notch 95 and the member 59 and its associated parts are free to rotate; and shortly thereafter the downward movement of roller 90 brings it below the level of the cam portion 75, so that the spring 72 can force the member 59 axially toward clutch-engaging position. Thus the energy for separating the bolt 98 from engagement with the wall of notch 95 is delivered from the solenoid coil 81, and not from the clutch spring 72, and friction effects between the disk 65 and the bolt 98 do not delay the clutch closing nor demand strength in the spring 72; and accordingly the spring 72 can be designed for action in relation to the forces established between the helical gears 61, 110, so that the clutch can open easily at low speed and with a small over-running force.

Closing movement of the clutch head assembly has caused the disk 65 to move axially so that it is free of the spring latch bolt 98.

During the clutch-closing movement of the member 59 under the action of spring 72, the interengagement of the helical gears 61, 110 causes the clutch head assembly to start revolving in the desired direction of drive, that is, in the direction of rotation of the shaft 30, and a silent closure of the clutch occurs. As soon as the clutch teeth 57, 58 engage, any tendency toward shock and noise is absorbed by the spring 72, through the interaction of the helical gears 65, 110, and therewith the helical gear 110 is set into action so that shaft 101 is rotated and therewith the cam 100 moves the roller 102 and forces the punch 26 to move downward for performing its action and then the springs 104 act to return the punch toward its initial position in cycle.

The article has meanwhile cleared the switch 121 which then opens the circuit, the solenoid coil 81 is deenergized, and the lever 85 moves upward under the action of spring 88, until detained by stop 91. The roller 90 thus rises into the path of the cam portion 75, and the spring bolt 98 rises to position for engagement with the disk 65. At this stage, the clutch teeth 57, 58 are still engaged, and thus the bolt 98 passes the edge of the disk 65. As the cam portion 75 engages the follower roller 90, the wedging action therebetween causes the clutch head assembly to move against the resistance of spring 72; the helical gear 61 travels in the helical gear 110; and the disk 65 comes against the stop bolt 98, depressing the latter against its spring 99.

In the event that several operations are to be performed upon a long article, so that the switch 121 does not open before the cam portion 75 first comes opposite the roller 90, the solenoid coil 81 continues energized, and the lever 85 is held down. The clutch drive continues, and a succession of operations are performed by minor cycles until the switch 121 opens after passage of the article, and the clutch is then opened at the close of operation upon the article, as before. Thus the primary illustration of employment by applying a single label to a single article is not restrictive of employment of the mechanism.

As the clutch head assembly and the parts driven thereby, including the punch 26, approach the end of cycle, the momentum after completion of the work and the co-action of cam 100 and roller 102 impose a lesser load upon the shaft 101 and thus a lesser demand for power through the clutch teeth. When the cam portion 75 encounters the roller 90, this roller causes the clutch head assembly to be moved in a direction to disengage the clutch teeth, again sliding the helical gears 61, 110 relative to one another but with a lighter loading therebetween so that the clutch teeth 57, 58 separate easily. The coasting of the gear train parts has brought the cam portion 75 to a position at which the roller 90 engages the radial part 76 of the cam as described above; the notch 95 receives the spring bolt 98 and the parts are brought accurately to standstill at the end of the cycle.

The end point of the cycle can be accurately adjusted for different load devices, by releasing the clamping nut 66, and rotating the disk 65 relative to the flange 60 of the member 59 and to the gear 61, and re-engaging the pin 62 in a properly located hole 64. The cam portion 76 is thereby accurately positioned for the roller 90, at a selected angular distance relative to the notch 95, so that the disengagement of the clutch parts is accurately followed by engagement of the bolt 98 in the notch 95 at the end of the travel of the disk 65 under momentum of parts and by reason of the relative axial movement of the helical gears 61, 110, and a quiet and shockless latching is effected.

The aforesaid copending patent application sets out structures and functions, wherewith articles such as envelopes are fed, and there are intermittent operations by cycles, for advancing a label sheet and moving a severing and applying punch for delivering labels to the articles, such intermittent operations being here effected by the closing and opening of the clutch. This illustrative employment of the clutch is not a restriction, as it is capable of employment in many devices where controlled intermittent or cyclic operations are involved.

Thus in operation, the intermittent drive mechanism has a low or even zero load characteristic at the beginning of a cycle whereby a silent and shockless closure is effected; a maximum load characteristic during the course of the cycle, a low or even zero load characteristic toward the end of the cycle when disconnection is to occur so that there is a silent and shockless opening without grinding of clutch teeth, and finally a speed reduction so that the parts are brought to and latched at a definite end point for the cycle, which position is held until actuation for the beginning of a new cycle.

It is obvious that the illustrative showing is not restrictive, and that the invention may be practiced in many ways within the scope of the appended claims.

I claim:

1. A clutch assembly comprising a support, a driving member, a first clutch element fixed on the driving member, a second clutch element, a first helical gear connected to the second clutch element, a second helical gear mounted on an axis parallel to that of said first helical gear and on the support and in mesh with the first helical gear, and means for moving the second clutch element into engagement with the first clutch element and therewith moving said first helical gear relative to said second helical gear for producing a relative rotation of said first helical gear and the second clutch element, the tooth angles of said helical gears being so directed that they cause said relative rotation to be in the direction in which the second clutch element is to be driven.

2. A clutch assembly through which power may be supplied cyclically to a load having a high energy demand during an early part of a cycle and a low energy demand during a closing part of the cycle, comprising a support, a driving shaft, a first clutch element fixed on the driving shaft, a member surrounding the driving shaft and rotatable and slidable relative thereto, a second clutch element connected to move with the said member, a first helical gear connected to move with the said member, a second helical gear mounted on the support and connected for driving the load, said helical gears being in mesh, spring means for urging the member axially for engaging the clutch elements together and therewith causing the teeth of the first helical gear to slide along the teeth of the second helical gear and thereby produce a relative rotation of said first helical gear, the tooth angles of said helical gears being so directed that they cause said relative rotation to be in the direction in which the second clutch element is to be driven.

3. A clutch assembly for driving a load, comprising a support, a driving member journalled in the support, a first clutch element fixed on the driving member, a coaxial second clutch element slidable and rotatable relative to said first clutch element, a first helical gear connected to rotate and slide with the second clutch element, a second helical gear journalled on the support and in mesh with the first helical gear and connected to drive the load, said helical gears being effective during the engaging movement of the second clutch element for causing said second clutch element to rotate in the driven direction thereof prior to clutch engagement, means for sliding the second clutch element into engagement with the first clutch element, and means for moving the second clutch element out of engagement with the first clutch element.

4. A clutch assembly comprising a support, a driving shaft, a first clutch element fixed on said driving shaft, a sleeve coaxially rotatable and slidable on said driving shaft, a second clutch element fixed on said sleeve, means on said second clutch element for actuating a load, spring means for moving the second clutch element into engagement with the first clutch element, a cam connected to the sleeve and having an axially projecting portion, a lever pivoted on the support for rocking movement in a longitudinal plane through the shaft axis, a cam follower carried by the lever and cooperative with the cam whereby the axially projecting portion causes a clutch-opening movement of the sleeve, a latch part on the sleeve and axially movable therewith, a releaseable latch carried by the lever and cooperative with the latch part for detaining the said projecting portion in a position with the clutch open, said lever having means for guiding the latch for movement toward and from the latch part in a direction essentially parallel to the axis of the sleeve, a spring for urging the latch toward the said latch part, and motion limiting means for restricting the movement of the latch toward the latch part.

5. A clutch assembly comprising a support, a driving shaft, a first clutch element fixed on said driving shaft, a sleeve coaxially rotatable and slidable on said driving shaft, a second clutch element fixed on said sleeve, means on said second clutch element for actuating a load, spring means for moving the second clutch element into engagement with the first clutch element, a cam connected to the sleeve and having an axially projecting portion, a cam follower on the support and cooperative with the cam whereby the axially projecting portion causes a clutch-opening movement of the sleeve, a disk mounted for coaxial rotational movement relative to the sleeve, said disk having a number of peripherally spaced holes and also having a latch part thereon, a pin carried in rotation with the sleeve and cooperative with a selected one of said disk holes whereby to adjustably determine the angular relationship about the sleeve axis between the said projecting portion and said latch part, and a releasable latch on the support cooperative with the latch part for detaining the said projecting portion in a position with the clutch open.

6. A clutch assembly comprising a support, a driving shaft, a first clutch element fixed on said driving shaft, a sleeve rotatable and slidable on said driving shaft, a second clutch element fixed on said sleeve, means on said second clutch element for actuating a load, spring means for moving the second clutch element into engagement with the first clutch element, a cam connected to the sleeve and having an axially projecting portion, a cam follower on the support and cooperative with the cam whereby the axially projecting portion causes a clutch-opening movement of the sleeve, a disk mounted for rotational movement relative to the sleeve and having a latch part thereon, means for causing the disk to move axially with the sleeve, means for preventing relative rotation of the disk and sleeve, and a releasable latch on the support cooperative with the latch part for detaining the said projecting portion in a position with the clutch open, said releasable latch comprising a spring-pressed bolt movable in the axial direction of the sleeve, and means for limiting the movement of the bolt, wherein the axial movement of the sleeve and disk during clutch closure moves the disk to a position free of said bolt.

7. A clutch assembly through which power may be supplied cyclically to a load having a high energy demand during an arly part of a cycle and a lower energy demand during a closing part of the cycle, comprising a support, a driving shaft, a first clutch element fixed on the driving shaft, a member surrounding the driving shaft and rotatable and slidable relative thereto, a second clutch element connected to move with the said member, a first helical gear connected to move with the said member, a second helical gear mounted on the support and connected for driving the load, spring means for urging the member axially for engaging the clutch elements together and therewith causing the teeth of the first helical gear to slide along the teeth of the second helical gear and thereby produce a relative rotation of said first helical gear, the tooth angles of said helical gears being so directed that they cause said relative rotation to be in the direction in which the second clutch element is to be driven, a latching part connected to the second clutch element, a latch on the support and movable toward and from the shaft axis, and effective in one position for engaging the said latching part and determining a stopped position of the second clutch element at the end of a cycle, and means for moving said latch.

8. A clutch assembly as in claim 7, in which the said latch is a spring-pressed bolt, and said latching part is provided by a disk connected to move with said member, said latch being engaged by the disk and yielding when the member moves toward clutch opening position prior to the end of a cycle.

9. A clutch assembly through which power may be supplied cyclically to a load having a high energy demand during an early part of a cycle and a lower energy demand during a closing part of the cycle, comprising a support, a driving shaft, a first clutch element fixed on the driving shaft, a member surrounding the driving shaft and rotatable and slidable relative thereto, a second clutch element connected to move with the said member, a first helical gear connected to move with the said member, a second helical gear mounted on the support and connected for driving the load, spring means for urging the member axially for engaging the clutch elements together and therewith causing the teeth of the first helical gear to slide along the teeth of the second helical gear and thereby produce a relative rotation of said first helical gear, the tooth angles of said helical gears being so directed that they cause said relative rotation to be in the direction in which the second clutch element is to be driven, a cam connected to move with the said member and having an axial projection, a cam follower on the support and movable toward and from the shaft axis, said cam follower in one position being in the path of said axial projection and cooperative therewith for moving the member and separating the clutch elements, and means for moving said cam follower.

10. A clutch assembly through which power may be supplied cyclically to a load having a high energy demand during an early part of a cycle and a lower energy demand during a closing part of the cycle, comprising a support, a driving shaft, a first clutch element fixed on the driving shaft, a member surrounding the driving shaft and rotatable and slidable relative thereto, a second clutch element connected to move with the said member, a first helical gear connected to move with the said member, a second helical gear mounted on the support and connected for driving the load, spring means for urging the member axially for engaging the clutch elements together and therewith causing the teeth of the first helical gear to slide along the teeth of the second helical gear and thereby produce a relative rotation of said first helical gear, the tooth angles of said helical gears being so directed that they cause said relative rotation to be in the direction in which the second clutch element is to be driven, a lever mounted on the support for movement substantially in an axial plane of the shaft and member, a cam connected for movement with the member and having an axial projection, a cam follower mounted on the lever and located in the path of said projection at one position of the lever, means for rocking the lever for moving the cam follower in the radial direction relative to the shaft and thereby out of engagement with said projection, and spring means for rocking the lever for restoring the cam follower for engagement by the projection.

11. A clutch assembly through which power may be supplied cyclically to a load having a high energy demand during an early part of a cycle and a lower energy demand during a closing part of the cycle, comprising a support, a driving shaft, a first clutch element fixed on the driving shaft, a member surrounding the driving shaft and rotatable and slidable relative thereto, a second clutch element connected to move with the said member, a first helical gear connected to move with the said member, a second helical gear mounted on the support and connected for driving the load, spring means for urging the member axially for engaging the clutch elements together and therewith causing the teeth of the first helical gear to slide along the teeth of the second helical gear and thereby produce a relative rotation of said first helical gear, the tooth angles of said helical gears being so directed that they cause said relative rotation to be in the direction in which the second clutch element is to be driven, a lever mounted on the support for movement substantially in an axial plane of the shaft and member, a cam connected for movement with the member and having an axial projection, a cam follower mounted on the lever and located in the path of said projection at one position of the lever, means for rocking the lever for moving the cam follower in the radial direction relative to the shaft and thereby out of engagement with said projection, spring means for rocking the lever for restoring the cam follower for engagement by the projection, a latching member having a peripheral notch connected for movement with the said member, and a bolt carried by the lever for engagement in said notch, whereby the movement of the lever by said rocking means causes the bolt to be removed from the notch by radial motion relative to the member.

12. A clutch assembly as in claim 11, in which a spring is present for urging the bolt axially toward the notch, and a stop device for limiting such axial movement of the bolt.

13. A clutch assembly comprising a support, a driving member and a first clutch element fixed on the driving member, a second clutch element movable axially for engaging and disengaging with the first clutch element, means connected to the second clutch element for actuating a load, a cam connected to move with the second clutch element and having an axially directed elevation, said member and elements and cam being coaxial, a rocker pivoted on said support to move about a rocker axis transverse to the cam axis, a cam follower on said rocker and movable therewith between a position of engagement with said cam and a position out of engagement therewith, a notched member having a notch and connected to rotate coaxially and move axially with the second clutch element, a latch on the rocker and movable therewith from a position of engagement in the notch and a position free therefrom, means on said rocker member for guiding the latch for movement essentially parallel to the axis of the notched member and means for detaining the latch free of the notched member when the latter is in the position occupied when the clutch elements are engaged, and a spring for urging the latch toward the notched member and effective for permitting said guided movement of the latch during the engagement of the cam follower with the cam and the consequent axial movement of the notched member into contact with the latch, said spring being effective for engaging the latch in said notch during the continued rotation of said notched member.

14. A clutch assembly as in claim 13, and including a spring acting for moving the second clutch element into engagement with the first clutch element and effective to hold the cam against the cam follower in a stopped position of the second clutch element.

15. A clutch assembly through which power may be supplied cyclically to a load having a high energy demand during an early part of a cycle and a low energy demand during a closing part of the cycle, comprising a support, a driving shaft, a first clutch element fixed on the driving shaft, a member surrounding the driving shaft and rotatable and slidable relative thereto, a second clutch element connected to move with the said member, a first helical gear connected to move with the said member, a second helical gear mounted on the support and connected for driving the load, a coil spring surrounding the driving shaft and reactive between the support and said member effective for urging the member axially for engaging the clutch elements together and therewith causing the teeth of the first helical gear to slide along the teeth of the second helical gear and thereby produce a relative rotation of said first helical gear, the tooth angles of said helical gears being so directed that they cause said relative rotation to be in the direction in which the second clutch element is to be driven, the clutch element having interengageable teeth, said teeth having axially directed surfaces for driving relationship and inclined surfaces, said inclined surfaces being so directed that a rotational movement of the member faster than the shaft will tend to produce a separation of the clutch elements.

References Cited in the file of this patent

UNITED STATES PATENTS

| 878,051 | Eberhardt | Feb. 4, 1908 |
| 1,216,645 | Ames | Feb. 20, 1917 |
| 1,701,189 | Mitchell | Feb. 5, 1929 |
| 1,811,655 | Smitmans | June 23, 1931 |
| 2,011,629 | Hahnemann et al. | Aug. 20, 1935 |
| 2,553,006 | Roche | May 15, 1951 |
| 2,670,636 | Burg | Mar. 2, 1954 |
| 2,777,552 | Flavin | Jan. 15, 1957 |

FOREIGN PATENTS

| 73,132 | Switzerland | Jan. 2, 1917 |